July 4, 1967

A. DE FEO ETAL 3,328,962

ORIENTATION CONTROL SYSTEM FOR SPACE
VEHICLES AND BALLISTIC MISSILES

Filed May 20, 1965

INVENTORS
ANGELO DE FEO
NORMAN J. ROLLERI

BY Raymond P. Wallace

AGENT

INVENTORS
ANGELO DE FEO
NORMAN J. ROLLERI
BY
Raymond P. Wallace
AGENT

INVENTORS
ANGELO DE FEO
NORMAN J. ROLLERI
BY Raymond P. Wallace
AGENT

United States Patent Office 3,328,962
Patented July 4, 1967

3,328,962
ORIENTATION CONTROL SYSTEM FOR SPACE
VEHICLES AND BALLISTIC MISSILES
Angelo De Feo, Totowa Boro, and Norman J. Rolleri,
Wayne, N.J., assignors to Curtiss-Wright Corporation, a
corporation of Delaware
Filed May 20, 1965, Ser. No. 457,350
12 Claims. (Cl. 60—228)

This invention relates to reaction engines for intermittent thrust, and to a reaction orientation device and fuel supply capable of providing thrust in discrete increments of standard impulse and to a coordinated system of maneuvering and controlling the orientation of a space vehicle or missile by a plurality of such devices.

Such devices are useful on a missile or vehicle in space for altering the velocity of the vehicle either additively or subtractively when the thrust is exerted on the vehicle along the line of motion either in the direction of travel or opposite thereto; or for altering the orientation of the vehicle axis by exerting thrust transversely thereto, to cause or control pitch and yaw; or for imparting roll or scend to the vehicle.

The present invention is an improvement over that disclosed in the copending application of George Kraus, Ser. No. 247,672 filed Dec. 27, 1962, entitled Attitude Control Device for Space Vehicles, which application is owned by the assignee of the present invention. In the Kraus application there is disclosed a concatenated series of small individual rocket engines bonded to a flexible feeding member, engaged with a power-driven sprocket wheel which transports the engines serially to a single firing position where each engine is fired, exerting thrust in a direction parallel to the axis of the sprocket wheel.

Since the direction of thrust from a single firing position, parallel to the drive wheel axis, was fixed in the prior art device of Kraus, it was necessary to have a large number of such transporting devices variously positioned, each with its own supply of serially fed engines, for the vehicle to be able to perform a complex set of maneuvers which may be required, with thrust exerted in a number of directions.

The present invention overcomes this disadvantage of the prior art by providing a transporting device and a concatenated series of individual rocket engines therefor, in which firing may take place at any of a plurality of positions circumferentially distributed around the sprocket wheel, with thrust exerted transversely to the axis of the wheel. With such a system it is possible for a vehicle or other free body equipped with four thrust devices appropriately mounted to perform evolutions which would have required sixteen devices of the prior art.

It is therefore an object of this invention to provide a means of applying thrust to a vehicle or missile or other free body.

It is a further object of the invention to provide means adapted to fine or gross orientation of a free body.

Another object is to provide means of applying thrust in discrete reaction impulses.

A still further object is to provide a coordinated system for orienting and controlling maneuvers of a space vehicle or missile.

Other objects and advantages will become apparent on reading the following specification in connection with the accompanying drawings, in which FIG. 1 is a side elevation of one of the individual rocket engines of the concatenated series, partly in cross-section taken along line 1—1 of FIG. 2;

Figure 1:
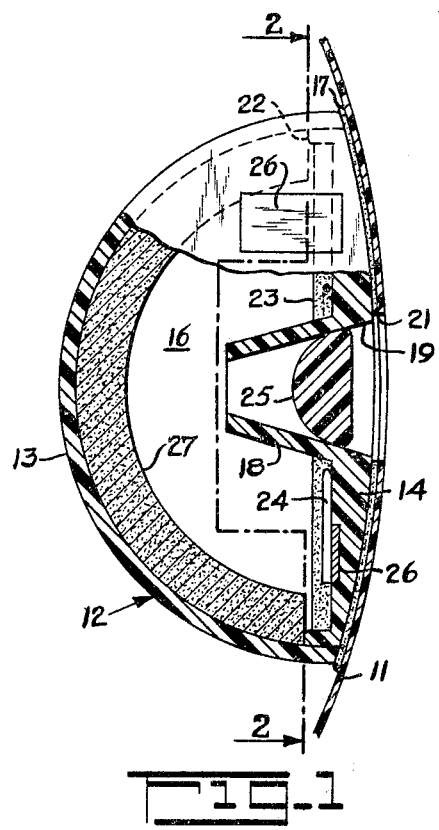
Figure 2:
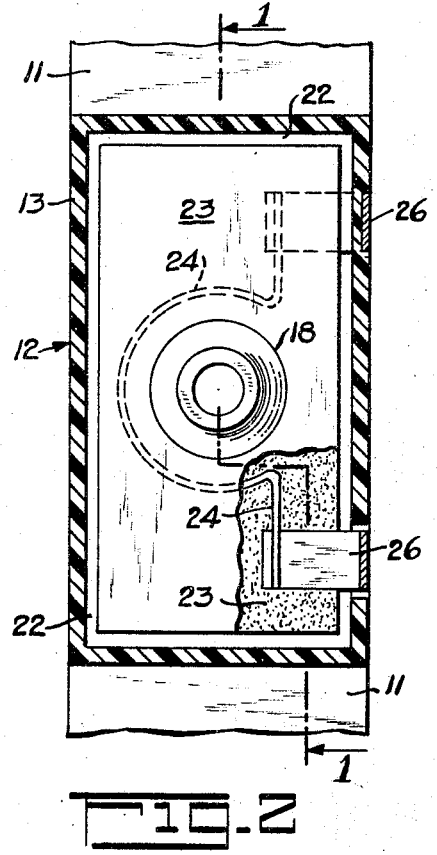
FIG. 2 is a cross-section taken along line 2—2 of FIG. 1.

In FIGS. 1 and 2 there is shown a poriton of a strip of flexible tape 11 having bonded thereto a reaction motor or rocket engine designated generally by the numeral 12. Any flexible material of suitable strength and thickness may be used for the tape; particulaly satisfactory materials are the polyethylene terephthalate resin sold under the trademark Mylar, and the polytetrafluoroethylene plastic known as Teflon, reinforced with glass fiber.

The housing of the engine 12 is formed of a hollow generally semicylindrical element 13 having end walls, and a closure member 14 mating therewith in subtending relation and bonded thereto, the two elements defining a generally semicylindrical combustion chamber 16. The closure 14 is a generally plate-like member, having its external side slightly curved and bonded 17 to the tape, and its internal side generally flat, with a frustoconical nozzle portion 18 extending therefrom and re-entrant into combustion chamber 16. The nozzle portion has an exhaust passage extending therethrough and through the remainder of the closure pate 14, which passage is divergent from the interior of the combustion chamber to a discharge orifice 19 on the opposite side of the closure member, the tape having a congruent aperture 21 to allow exhaust of the combustion gases. Such a passage acts as a converging-diverging exhaust nozzle in combination with the combustion chamber. Housing members 13 and 14 may be made of plastic or any other conveient lightweight material of suitable strength, and making the nozzle re-entrant saves a considerable thickness of the closure plate, with consequent reduction in size and weight of the engine.

Closure plate 14 is provided with a low peripheral rim 22 on its inner side to provide a shallow dish-like cavity or tray portion surrounding the nozzle. A thin layer of a ocmbustion-promoting pyrotechnic material 23 occupies the tray portion, being deposited thereon as by molding or pressing. An igniter element 24 is embedded in the pyrotechnic material, and may be the pyrofuse wire shown substantially encircling the nozzle, or any other convenient electrical resistance material. A pair of electrical leads 26 are in electrical contact with the igniter and extend outwardly through one end of the housing of the rocket engine.

A charge 27 of solid rocket propellant material is disposed within the combustion chamber 16, being in the embodiment shown a semicylindrical element disposed around the interior of housing member 13 and embracing the re-entrant nozzle portion, with its ends in close proximity to the combustion-promoter 23. When an electrical circuit is energized through leads 26 the fuse wire 24 or other resistance flashes into incandescence, igniting the combustion-promoter 23 which has a low ignition temperature and a very rapid burning rate. Flame from the combustion-promoter ignites the whole inner surface of the charge 27, which thereupon burns evenly in a radially outward direction, the combustion gases converging to the entrance of the nozzle portion and exhausting through the divergent passage.

The propellant 27 may be of any suitable explosive material, the choice of which may vary widely according to desired burning characteristics, such as the temperature of ignition, burning rate, and thrust or pressure developed. One particular composition which has been successfully used comprises a mixture of potassium perchlorate and rubber, which possesses the necessary storage life either in air or in a space environment, and which is readily moldable, either in place in the encapsulated engine, in sheets which may be cut into pieces of the desired size, or in curved shapes for ready insertion into the housings. If desired, the divergent portion of the nozzle may be closed by a plug 25 which blows out through the orifice at some predetermined pressure, in order that full thrust may be developed from each capsule firing.

To form the concatenated series of engines, a plurality of such individual reaction motors are spaced along one side of the tape 11 and bonded thereto. Such a series may be stored in a magazine, pleated in such a manner as to run freely therefrom when required, the first two or three engines being threaded into the transporting mechanism described below.

Figure 3:
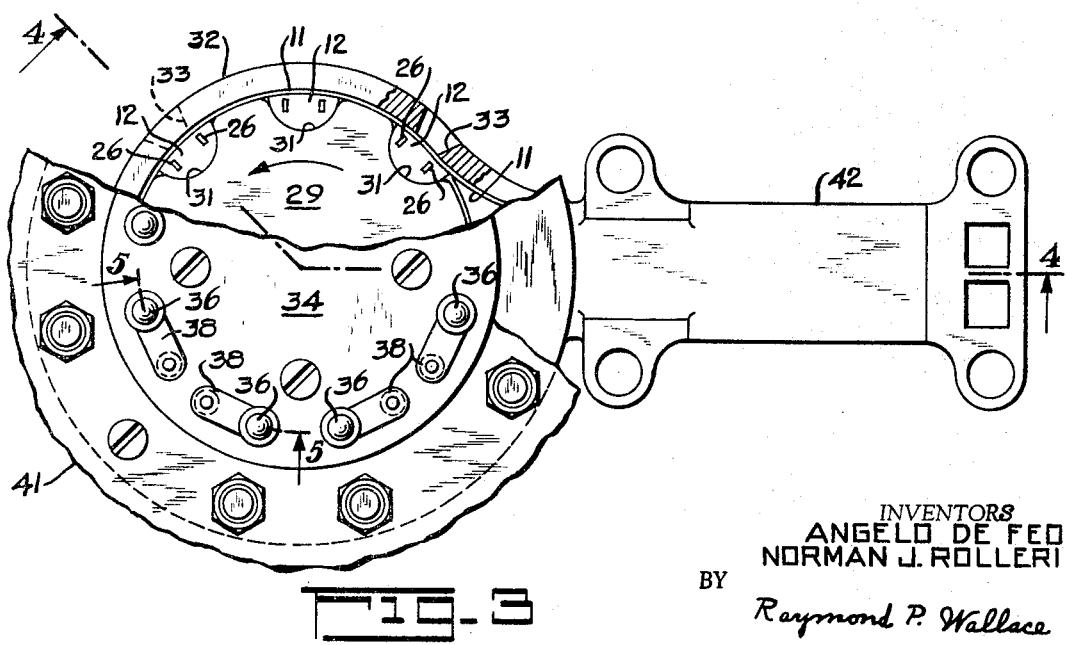
FIG. 3 is a plan view of the transporting mechanism for the concatenated series of one of the orientation devices, partially cut away.
Figure 4:
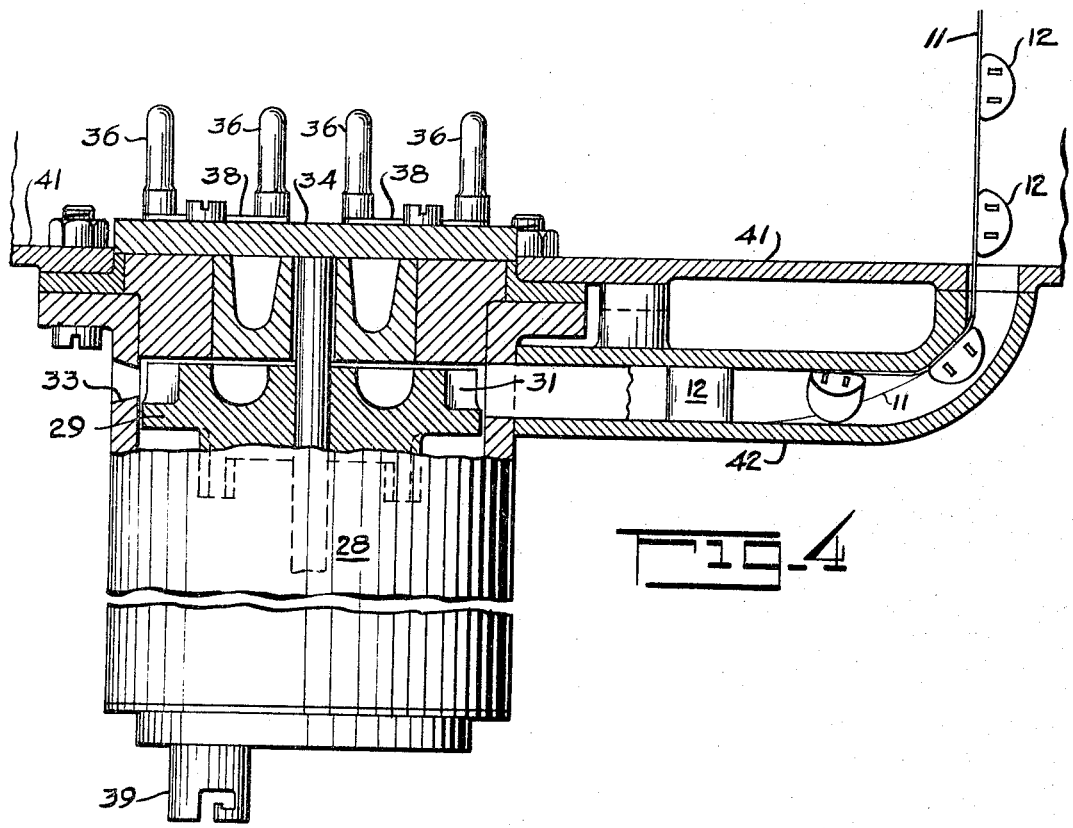
FIG. 4 is an elevation partly in cross-section taken on line 4—4 of FIG. 3.

In FIGS. 3 and 4 there is shown the transporting mechanism for advancing and firing the concatenated series of rocket engines. A stepper motor 28 of conventional type is intermittently rotatable in increments of the desired number of degrees. A sprocket drive wheel 29 rotatable in the direction shown by the arrow is mounted on the output shaft of the motor, the periphery of the wheel being provided with a plurality of cavities 31 of generally semicylindrical shape conforming to the size and shape of the rocket engines and suitable for engagement therewith, the spacing of the cavities around the wheel being equal to that between the individual engines along the tape of the concatenated series. In the embodiment shown there are eight such cavities, but the number may be varied as desired, within the limits imposed by the size of the engines and the diameter of the sprocket wheel.

An external guide plate 32 surrounds the major portion of the drive wheel, being radially spaced therefrom a sufficient distance to allow passage to the tape 11 as the engines 12 engage with the cavities 31 of the wheel. The guide plate is coaxial with the rotational axis of the wheel, and the arcuate surfaces of closure plates 14 bonded to the tape have a curvature congruent with the inner surface of the guide plate. Guide plate 32 is apertured at 33 coaxially with the discharge orifices 19 of the exhaust nozzles of the engines at each firing position, there being in the embodiment shown four such firing positions spaced at ninety degrees around the axis of the drive wheel. However, there may be any number of such firing positions, from one only, up to the maximum number of engines which may be contained in the sprocket wheel. For most orienting maneuvers, and for the mounting systems of orienting devices hereinafter described, four is a convenient number of firing positions.

Figure 5:
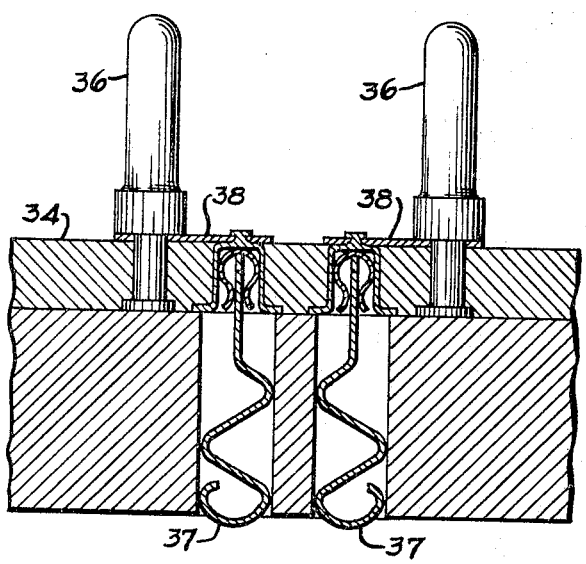
FIG. 5 is a fragmentary cross-section taken on line 5—5 of FIG. 3.

The stepper motor 28 is provided with a cover plate 34 of insulating material over the sprocket wheel, bearing electrical contact prongs 36 (better shown in FIG. 5) suitable for engagement with receptacles for completing the various firing circuits. Spring contacts 37, electrically connected to prongs 36 by jumpers 38, extend through cover plate 34 toward the sprocket wheel, and are so positioned that a pair make contact with the engine leads 26 at each firing position. The motor also bears a bayonet connector 39 or other convenient input member for the power supply (not shown) for driving the motor.

Figure 6:
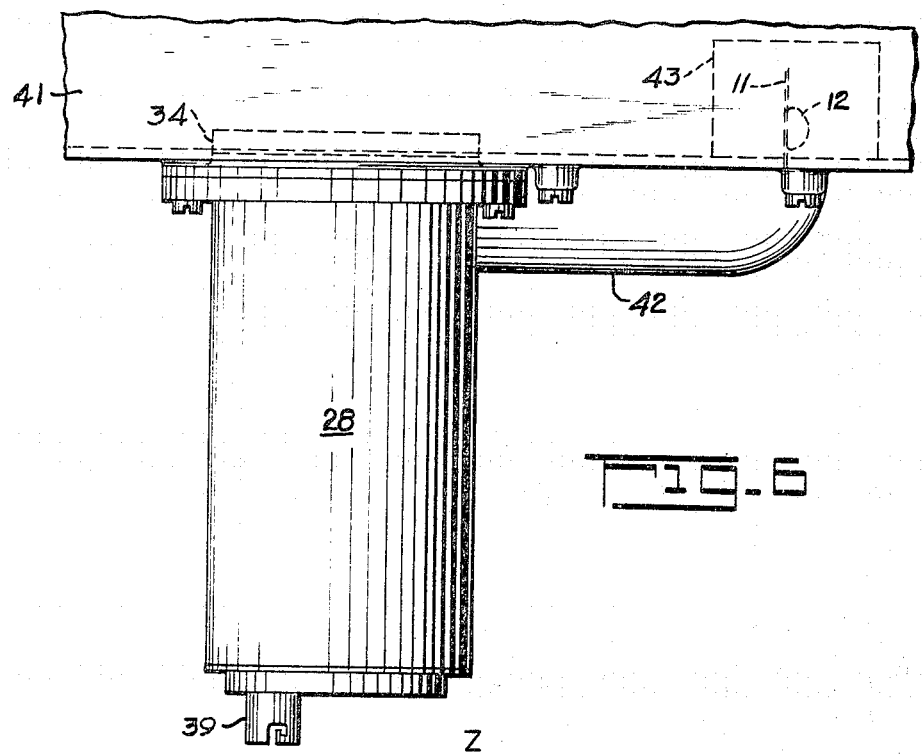
FIG. 6 is a fragmentary view showing the mounting of one of the orientation devices on a vehicle or missile.

As shown in FIG. 6, one of the orientation devices is mounted on the surface of a space vehicle or missile 41, the prongs 36 being plugged into receptacles in the skin of the vehicle. The motor shell is provided with a hollow extension member 42 which serves both as a mounting bracket and as a feedway through which the tape 11 bearing the concatenated series of engines 12 is supplied to the sprocket wheel. In the embodiment shown the magazine 43 bearing the supply of tape and engines is contained within the vehicle and communicates with feedway 42, and the tape bearing fired engines exiting from the orientation device may feed back into the vehicle to a take-up mechanism. However, the magazine may also be borne externally of the vehicle, and the exiting tape may be allowed to float free if desired.

In the operation of a single such orientation device, the stepper motor and firing circuit may be energized manually by switches under the control of an operator within the vehicle, or by remote control. The stepper motor will advance the concatenated series intermittently by steps of the selected number of degrees, firing the engines serially at the selected position. A single engine may be fired at the selected position, or a burst of any desired number, the reaction from each having a summative effect in thrust.

Figure 7:
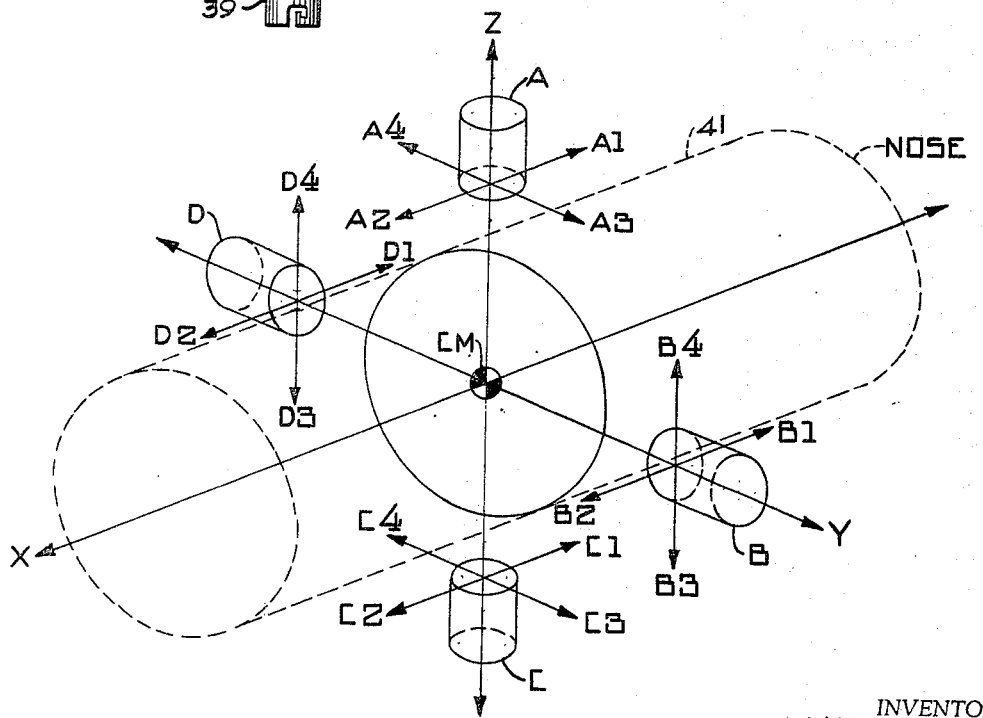
FIG. 7 is a schematic view of a coordinated system of a plurality of orientation devices for controlling a free body such as a vehicle or missile.

FIG. 7 shows schematically a representation of a coordinated orientation system, with a mode of mounting four of the present orientation devices each having a plurality of firing positions in such a way that they will perform the work of sixteen prior art devices each having a single firing position. A free body 41 such as a vehicle or missile is shown schematically in dashed outline, established on a system of rectangular Cartesian coordinates X, Y, and Z, and having its center of mass (CM) approximately midway between its ends and on its longitudinal axis or co-ordinate X, which is the direction of travel. Four orientation devices A, B, C, and D are mounted on the exterior of the vehicle equidistantly circumferentially disposed around the center of mass and at equal radial distances therefrom, with the rotational axes of the drive wheels transverse to the longitudinal axis of the vehicle, and so positioned that thrust from the discharge of rocket engines at any of the four firing positions of each device will be exerted in a direction parallel to one or another of the co-ordinates.

Assuming the direction of travel of body 41 to be along the X coordinate toward the right-hand end of the diagram, orientation device A is mounted on the "top" (as shown in the drawing) of the vehicle, device B on the right-hand side, device C on the "bottom" and device D on the left-hand side. Direction of thrust is indicated by the arrows A–1, A–2, etc. for each of the firing positions of each of the orientation devices. Maneuvers are than accomplished by firings according to the following table.

| Firing positions: | Control |
| --- | --- |
| A–2, C–2, and/or B–2, D–2 | Thrust, forward. |
| A–1, C–1 and/or B–1, D–1 | Thrust, reverse. |
| A–2 and C–1 | Pitch, nose down. |
| A–1 and C–2 | Pitch, nose up. |
| B–1 and D–2 | Yaw, right. |
| B–2 and D–1 | Yaw, left. |
| A–4, C–3 and/or B–4, D–3 | Roll, clockwise. |
| A–3, C–4 and/or B–3, D–4 | Roll, counterclockwise. |
| B–3 and D–3 | Scend, up. |
| B–4 and D–4 | Scend, down. |
| A–4 and C–4 | Lateral displacement, right. |
| A–3 and C–3 | Lateral displacement, left. |

When the exterior configuration of the vehicle or other body 41 is such that the orientation devices cannot be positioned at equal radial distances from co-ordinate X, it is still possible to perform the same maneuvers with the same combinations, but the thrust from any two cooperating devices must be appropriately balanced, that is, the device closer to the X co-ordinate and therefore having a shorter moment arm must fire proportionately more rocket engines that its co-operating mate.

Figure 8:
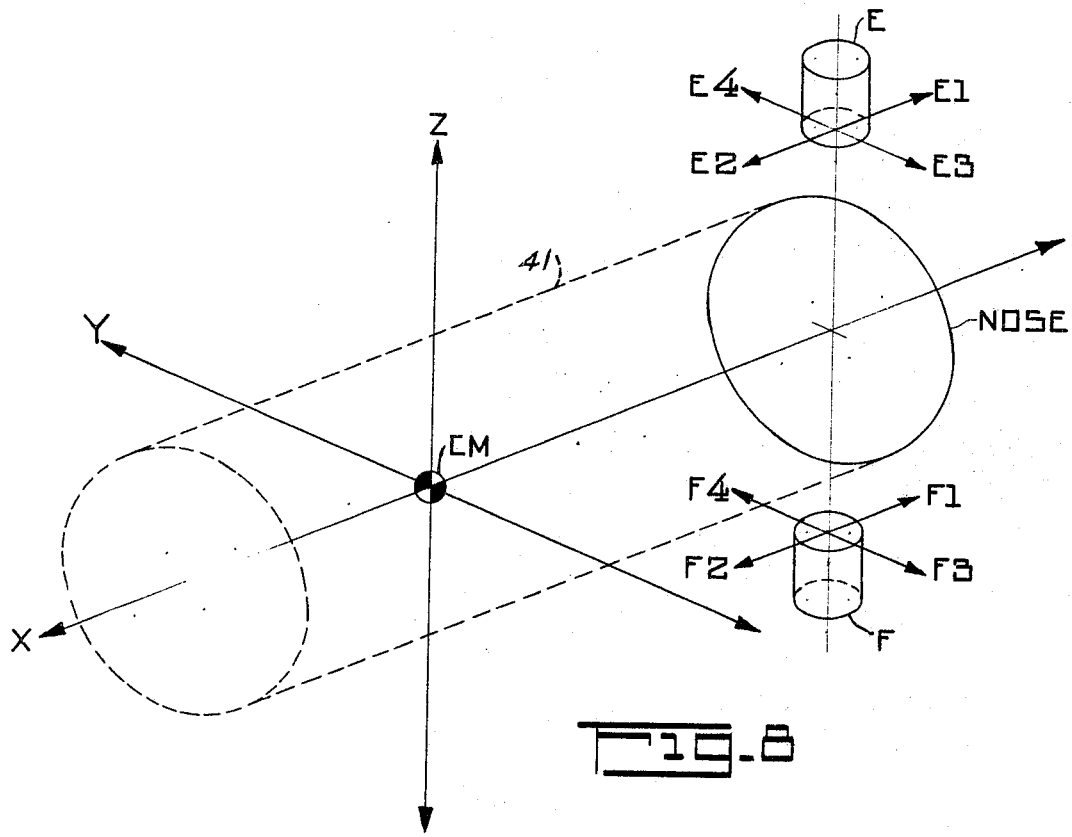
FIG. 8 is a similar schematic of another controlling system.

FIG. 8 is a schematic diagram similar to FIG. 7, but showing only two orientation devices, differently mounted with respect to the center of mass. A vehicle 41 is shown in outline form, again established on a system of rectangular Cartesian co-ordinates. Devices E and F are mounted on the periphery of the vehicle at the nose, and at the top and bottom thereof, respectively. In this mode the center of mass is aft of the mounting position of the orientation devices, the direction of travel being again considered to be along the X co-ordinate toward the right-hand side of the drawing. With two devices so mounted, maneuvers may be performed according to the following table.

| Firing positions: | Control |
| --- | --- |
| E–2 and F–2 | Thrust, forward. |
| E–1 and F–1 | Thrust, reverse. |
| E–2 and F–1 | Pitch, nose down. |
| E–1 and F–2 | Pitch, nose up. |
| E–4 and F–4 | Yaw, right. |
| E–3 and F–3 | Yaw, left. |
| E–4 and F–3 | Roll, clockwise. |
| E–3 and F–4 | Roll, counterclockwise. |

In this mounting mode two orientation devices will perform the work of eight of the prior art, with a high degree of control. The only maneuvers this mode lacks compared to that of FIG. 7 are the displacements of the longitudinal axis without altering its angle, in the vertical and lateral directions. It will be readily apparent that there are other possible mounting modes of various numbers of orientation devices.

Although the invention has been described above in a preferred embodiment, changes and modifications may be made by those skilled in the art without departing from the concept of the invention. It is intended to cover all such modifications in the appended claims.

What is claimed is:

1. A reaction engine for orientation control of free bodies, comprising in combination a housing formed of relatively rigid material having a generaly semicylindrical member and end walls and a closure plate, said closure plate having a generally flat inner surface and an arcuate outer surface and defining with said semicylindrical member and said end walls a combustion chamber within said housing, said closure plate having a frustoconical nozzle portion extending from the flat side thereof and re-entrant within said combustion chamber, said nozzle and closure plate having an exhaust passage therethrough and having a discharge orifice at said arcuate outer surface, a solid propellant charge disposed within said combustion chamber, said closure plate having combustion-promoting material disposed on said flat side in close proximity to said propellant charge, electrical resistance means in contact with said combustion-promoting material, and a pair of electrical leads connected electrically with said resistance means and extending through said housing to the exterior thereof.

2. A concatenated series of reaction engines as recited in claim 1, said engines being spaced along a flexible tape member and bonded thereto, said tape having an aperture therethrough congruent with each of said discharge orifices.

3. An orientation device for space vehicles, missiles, and the like, comprising in combination a concatenated series of individual reaction engines spaced along a flexible tape member and bonded thereto, each of said engines having a housing formed of relatively rigid material of generally semicylindrical configuration and having a propellant charge disposed therein and having an exhaust nozzle, said tape member having a discharge aperture therethrough congruent with each of said nozzles, transporting means for said concatenated series including a stepper motor having an output drive shaft, a drive wheel mounted on said drive shaft and having a plurality of generally semicylindrical cavities disposed around the periphery thereof, each of said cavities being engageable with one of said engines, said transporting means having a plurality of firing positions, said motor and said drive wheel being intermittently rotatable in discrete pulses providing precise angular increments of rotation for serially transporting said engines to a selected one of said firing positions, each of said engines having disposed therein electrical resistance means for igniting said propellant charge and having a pair of electrical leads extending from said housing and connected electrically with said resistance means, said orientation device having a pair of electrical contacts disposed at each of said firing positions making electrical contact with said engine leads for completing an electrical circuit to each of said engines serially at said selected firing position.

4. An orientation system for space vehicles, missiles, and the like, comprising in combination a body having X, Y, and Z axes on rectangular Cartesian co-ordinates, and a plurality of reaction-thrust orientation devices mounted on the exterior of said body and capable of selectively exerting reaction thrust parallel to each of said axes, each of said orientation devices comprising a concatenated series of individual reaction engines spaced along a flexible tape member and bonded thereto, each of said engines having a housing formed of relatively rigid material of generally semicylindrical configuration and having a propellant charge disposed therein and having an exhaust nozzle, said tape member having a discharge aperture therethrough congruent with each of said nozzles, transporting means for said concatenated series including a stepper motor having an output drive shaft, a drive wheel mounted on said drive shaft and having a plurality of generally semicylindrical cavities disposed around the periphery thereof and spaced apart congruently with the spacing of said engines along said tape, each of said cavities being engageable with one of said engines, the transporting means of each of said orientation devices having a plurality of firing positions, said motor and said drive wheel being intermittently rotatable in discrete pulses providing precise angular increments of rotation for serially transporting said engines to a selected one of said firing positions, each of said engines having disposed therein electrical resistance means for igniting said propellant charge and having a pair of electrical leads extending from said housing and connected electrically with said resistance means, each of said orientation devices having a pair of electrical contacts disposed at each of said firing positions making electrical contact with said engine leads for completing an electrical circuit to each of said engines serially at said selected firing position.

5. The combination recited in claim 4, wherein each of said orientation devices is positioned to exert reaction thrust selectively parallel to two of said axes.

6. The combination recited in claim 4, wherein said X axis is the longitudinal axis of said body, and said orientation devices are equidistantly radially spaced therefrom and equidistantly circumferentially therearound.

7. A reaction engine for orientation control of free bodies, comprising in combination a housing formed of relatively rigid material having a generally semicylindrical member and end walls and a closure plate subtending said semicylindrical member and defining therewith a combustion chamber within said housing; said closure plate having a generally flat inner surface and an arcuate outer surface and having a frustoconical nozzle portion extending from said flat side concentrically therewith and re-entrant within said combustion chamber; said nozzle portion and closure plate having an exhaust passage therethrough and a discharge orifice in said arcuate outer surface, said exhaust passage diverging from the inner end to said orifice; semicylindrically curved layer of solid propellant material disposed on the curved inner surface of said semicylindrical member and having ends adjacent to said closure plate, said re-entrant nozzle portion being disposed between the ends of said propellant material; a layer of combustion-promoting material disposed on the flat inner surface of said closure plate; electrical resistance means for igniting said combustion-promoting material in contact therewith; and a pair of electrical leads connected electrically to said resistance means and extending through one of said end walls to the exterior thereof.

8. A concatenated series of reaction engines as recited in claim 7, said engines being spaced along a flexible tape member and having the arcuate surfaces of said closure plates bonded thereto, said tape having an aperture therethrough congruent with each of said discharge orifices.

9. An orientation device for space vehicles, missiles, and the like, comprising in combination a concatenated series of individual reaction engines spaced along a flexible tape member and bonded thereto, each of said engines having a housing formed of relatively rigid material having a generally semicylindrical member and end walls and a closure plate subtending said semicylindrical member and defining therewith a combustion chamber within said housing; said closure plate having a generally flat inner surface and an arcuate outer surface and having a frustoconical nozzle portion extending from said flat side concentrically therewith and re-entrant within said combustion chamber; said nozzle portion and closure plate having an exhaust passage therethrough and a discharge orifice in said arcuate outer surface, said exhaust passage diverging from the inner end of said nozzle portion to said orifice; a semicylindrically curved layer of solid propellant material disposed on the curved inner surface of said semicylindrical member and having ends adjacent to said closure plate, said re-entrant nozzle portion being disposed between the ends of said propellant material; a layer of combustion-promoting material disposed on the flat inner surface of said closure plate; electrical resistance means for igniting said combustion-promoting material in contact therewith; a pair of electrical leads connected electrically to said resistance means and extending through one of said end walls; the arcuate surfaces of said closure plates being bonded to said tape, said tape being apertured therethrough congruently with each of said discharge orifices; transporting means for said concatenated series including a stepper motor having an output drive shaft; a drive wheel mounted on said drive shaft and having a plurality of generally semicylindrical cavities disposed around the periphery thereof and spaced apart congruently with the spacing of said engines along said tape, each of said cavities being engageable with one of said engines; said transporting means having four firing positions spaced ninety degrees apart; a generally circular guide plate substantially surrounding said wheel and radially spaced therefrom a distance sufficient to allow the passage of said tape therebetween; said guide plate having a passage therethrough at each of said firing positions congruent with said discharge orifice when an engine is positioned at said firing position; said motor and said drive wheel being intermittently rotatable in discrete pulses providing precise angular increments of rotation for serially transporting and positioning said engines at a selected one of said firing positions; said orientation device having a pair of electrical contacts disposed at each of said firing positions making electrical contact with a pair of said engine leads for completing an electrical circuit to each of said engines serially at said selected firing position, said engines fired at said selected position exerting reaction thrust on said device in a direction transverse to the rotational axis of said wheel.

10. An orientation system for space vehicles, missiles, and the like, comprising in combination a body having X, Y, and Z axes on rectangular Cartesian co-ordinates, said X axis being the longitudinal axis of said body, and a plurality of reaction-thrust orientation devices mounted on the exterior of said body and capable of selectively exerting reaction thrust parallel to each of said axes, each of said orientation devices comprising a concatenated series of individual reaction engines spaced along a flexible tape member and bonded thereto, each of said engines having a housing formed of relatively rigid material having a generally semicylindrical member and end walls and a closure plate subtending said semicylindrical member and defining therewith a combustion chamber within said housing; said closure plate having a generally flat inner surface and an arcuate outer surface and having a frustoconical nozzle portion extending from said flat surface concentrically therewith and re-entrant within said combustion chamber; said nozzle portion and closure plate having an exhaust passage therethrough and a discharge orifice in said arcuate outer surface, said exhaust passage diverging from the inner end of said nozzle portion to said orifice; a semicylindrically curved layer of solid propellant material disposed on the curved inner surface of said semicylindrical member and having ends adjacent to said closure plate, said re-entrant nozzle portion being disposed between the ends of said propellant material; a layer of combustion-promoting material disposed on the flat inner surface of said closure plate; electrical resistance means for igniting said combustion-promoting material in contact therewith; a pair of electrical leads connected electrically to said resistance means and extending through one of said end walls; the arcuate surfaces of said closure plates being bonded to said tape, said tape being apertured therethrough congruently with each of said discharge orifices; transporting means for said concatenated series including a stepper motor having an output drive shaft; a drive wheel mounted on said drive shaft and having a plurality of generally semicylindrical cavities disposed around the periphery thereof and spaced apart congruently with the spacing of said engines along said tape, each of said cavities being engageable with one of said engines; said transporting means having four firing positions spaced ninety degrees apart; a generally circular guide plate substantially surrounding said wheel and radially spaced therefrom a distance sufficient to allow the passage of said tape therebetween, said guide plate having a passage therethrough at each of said firing positions congruent with said discharge orifice when an engine is positioned at said firing position; said motor and said drive wheel being intermittently rotatable in discrete pulses providing precise angular increments of rotation for serially transporting and positioning said engines at a selected one of said firing positions; said orientation device having a pair of electrical contacts disposed at each of said firing positions making electrical contact with a pair of said engine leads for completing an electrical circuit to each of said engines serially at said selected firing position, said engines fired at said selected position exerting reaction thrust on said device in a direction transverse to the rotational axis of said wheel; each of said orientation devices being mounted on said body with the rotational axis of said wheel disposed transverse to said X axis.

11. The combination recited in claim 10, wherein each of said orientation devices is positioned to exert reaction thrust selectively parallel to two of said body axes.

12. The combination recited in claim 10, wherein said orientation devices are equidistantly radially spaced from said X axis and equidistantly circumferentially therearound, each of said orientation devices having feeding means to channel said concatenated series to said wheel, said body containing a magazine for storing said concatenated series, said feeding means communicating therewith.

References Cited

UNITED STATES PATENTS

| | | | |
|---|---|---|---|
| 2,974,594 | 3/1961 | Boehm | 60—35.54 X |
| 2,995,319 | 8/1961 | Kershner et al. | 244—52 X |
| 3,015,210 | 1/1962 | Williamson et al. | 60—35.54 |
| 3,061,239 | 10/1962 | Rusk | 244—1 |
| 3,210,930 | 10/1965 | Leeper et al. | 60—35.6 |
| 3,231,223 | 1/1966 | Upper | 244—1 X |

CARLTON R. CROYLE, *Primary Examiner.*